C. A. PARSONS AND S. S. COOK.
PACKING RING FOR ROTATING BODIES.
APPLICATION FILED MAY 3, 1920.

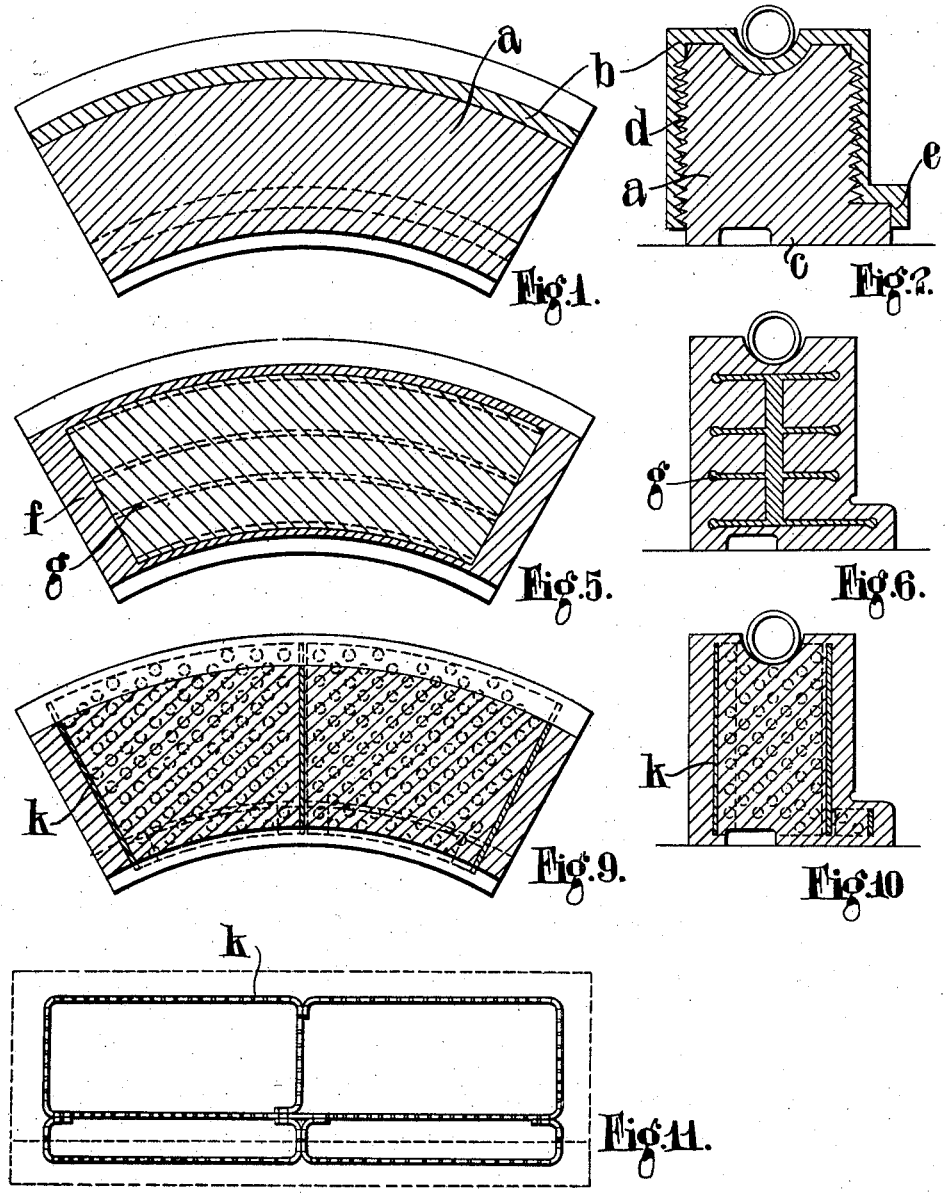

1,428,975.

Patented Sept. 12, 1922.
2 SHEETS—SHEET 2.

Patented Sept. 12, 1922.

1,428,975

UNITED STATES PATENT OFFICE.

CHARLES ALGERNON PARSONS, OF NEWCASTLE-UPON-TYNE, AND STANLEY SMITH COOK, OF WALLSEND-UPON-TYNE, ENGLAND, SAID COOK ASSIGNOR TO SAID PARSONS.

PACKING RING FOR ROTATING BODIES.

Application filed May 3, 1920. Serial No. 378,572.

*To all whom it may concern:*

Be it known that we, CHARLES ALGERNON PARSONS, K. C. B., a subject of the King of Great Britain and Ireland, and residing at Heaton Works, Newcastle-upon-Tyne, in the county of Northumberland, England, and STANLEY SMITH COOK, a subject of the King of Great Britain and Ireland, and residing at Turbinia Works, Wallsend-upon-Tyne, in the county of Northumberland, England, have invented certain new and useful Improvements in Packing Rings for Rotating Bodies, of which the following is a specification.

This invention relates to packing glands for rotating bodies, and is more particularly applicable to glands for packing the rotors of steam turbines, and consisting of rings made up of sections and composed of carbon or the like graphitic material.

Such packing rings are liable to accidental breakage, and this has to some extent prevented their use in glands which are not readily accessible, as a considerable steam leakage is liable to occur as a result of the failure of the rings.

The object of the invention is to provide gland packing rings of carbon or the like material which will be less liable to failure than those hitherto employed.

The invention consists in mounting each of the carbon sections in a frame composed of metal having substantially the same rate of thermal expansion as the carbon or like material of the section.

The invention also consists in moulding or otherwise forming the carbon or like material of the section about a skeleton frame composed of metal having a co-efficient of thermal expansion substantially equal to that of the carbon or like graphitic material employed.

The invention further consists in the improved carbon gland packings hereinafter described.

Referring to the accompanying drawings:—

Figures 1 and 2 are sections at right angles showing one form of the invention.

Figures 5 and 6 show an arrangement in which a metallic skeleton frame is employed.

Figures 9, 10 and 11 show a form in which perforated plates are embedded in the carbon, while

As shown in Figures 1 and 2, each section $a$ of carbon or like material is mounted in a frame $b$ of nickel steel having substantially the same rate of thermal expansion as the material of the section, said frame having substantially the same circumferential length as the section and enveloping the peripheral surfaces of the latter with the exception of the surface $c$ which makes contact with the rotating member, this latter surface of the section projecting slightly from the frame so that the frame does not come into contact with the rotating member. The carbon is preferably retained in the frame by fitting into circumferentially disposed projections or serrations $d$ in the latter but it may be retained by screws or other means.

Figure 3:
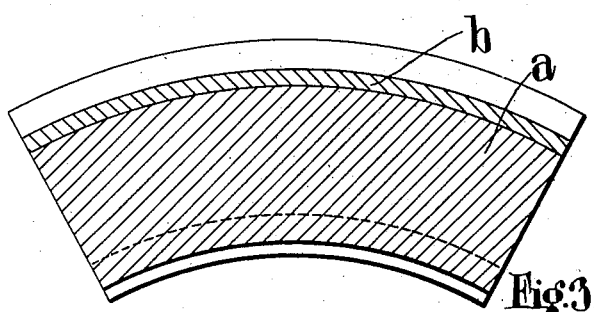
Figures 3 and 4 are similar views of another form.
Figure 4:
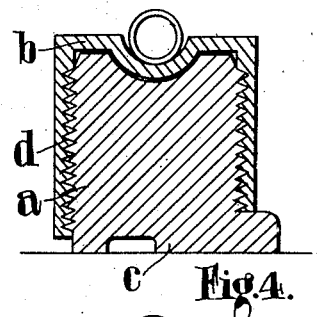

In Figures 3 and 4 the metallic frame is similar to that shown in Figures 1 and 2 with the exception that the lip $e$ of the frame, Figures 1 and 2, is omitted.

Figure 7:
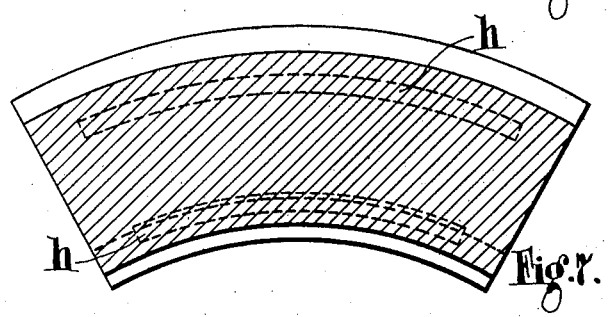
Figures 7 and 8 show another form of frame.
Figure 8:
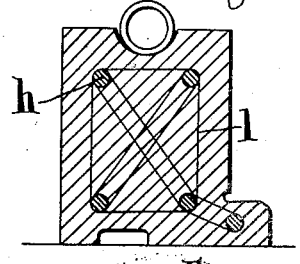

In the form of the invention shown in Figures 5 and 6, the carbon or like material $f$ is cast or pressed or otherwise formed about a skeleton frame $g$ composed of metal having substantially the same rate of thermal expansion as the other material composing the section. The shape of the frame is so designed that it reinforces substantially the whole of the section without passing through the working faces. The frame is in the form of a metallic plate placed perpendicular to the axis of the shaft with projections at intervals radially or circumferentially. In the form shown in Figures 7 and 8 a structure of metallic rods $h$ preferably laced together by wires $l$ is employed.

In the form of the invention shown in Figures 9, 10 and 11, bent perforated plates $k$ are employed embedded in the carbon in the same way as the frames above described.

Figure 12:
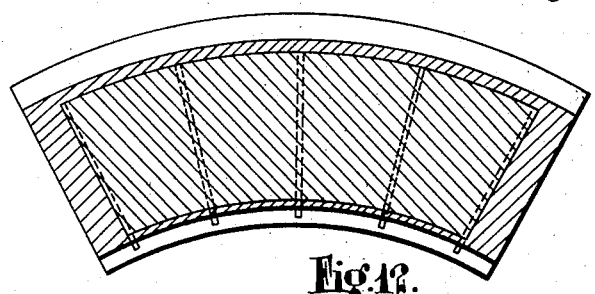
Figures 12, 13 and 14 show a further form of metallic frame embedded in the carbon.
Figure 13:
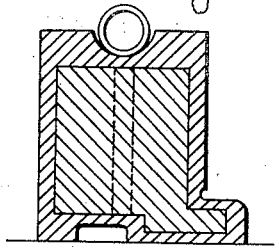
Figure 14:
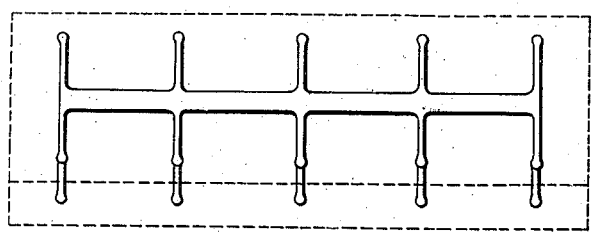

In Figures 12, 13 and 14 a framework is employed having projections extending in radial planes instead of circumferentially as shown in Figures 5 and 6.

It will be seen that if the carbon or like material cracks through vibration or through development of inherent flaws or other causes, the reinforcing frame will hold the pieces together and prevent the collapse of the section. Thus, although a slight increase in the steam leakage may result from the crack, serious loss by leakage is prevented.

Any metal may be employed for the frame which has a rate of thermal expansion substantially equal to that of the carbon or like material, this rate usually being very low in comparison with ordinary metals. For instance, steel with a suitable percentage of nickel may be employed, or an alloy having proper percentages of antimony and lead. A material with a high melting point is, however, preferred because if the carbon is pressed by the steam into contact with the rotating member—a condition which obtains with an unbalanced ring or which is possible with an originally balanced ring when damaged—very high temperatures are liable to be caused by the frictional heat.

The advantage of this type of ring is that should a carbon section or sections become cracked from any cause, they will not break up and allow serious leakage, so that the machine may run until it is convenient to dismantle it and replace the damaged section or ring.

Having now described our invention, what we claim as new and desire to secure by Letters Patent is:—

1. A packing ring section comprising graphitic material such as carbon moulded on a metal frame confined to said section.

2. A packing ring section comprising graphitic material such as carbon moulded on a metal frame confined to said section, said frame being embedded in said graphitic material.

3. A packing ring section consisting of graphitic material such as carbon associated with a metal reinforcement, said metal having a coefficient of expansion substantially the same as that of the graphitic material.

In testimony whereof we have signed our names to this specification.

CHARLES ALGERNON PARSONS,
STANLEY SMITH COOK.